Patented Apr. 26, 1938

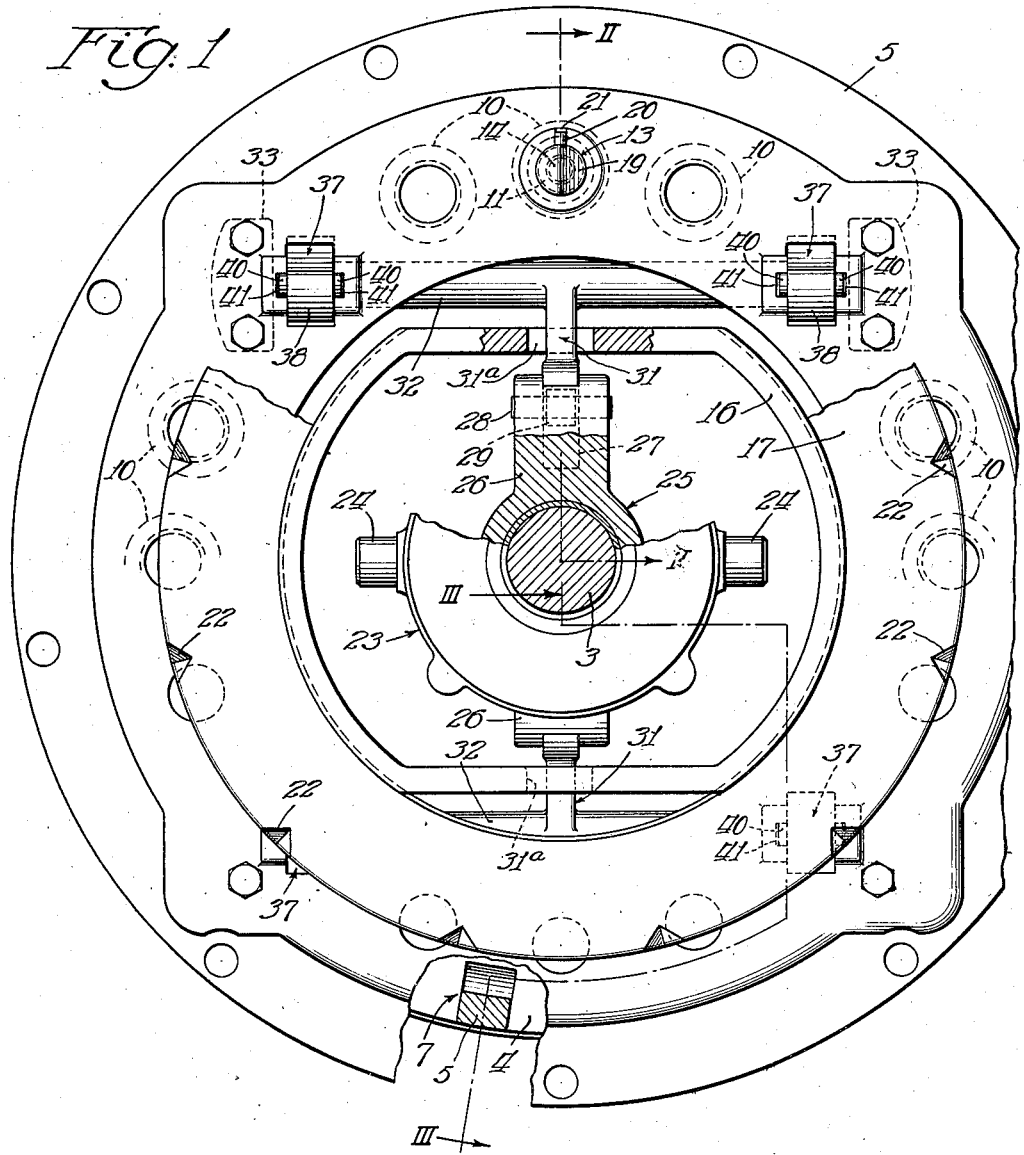

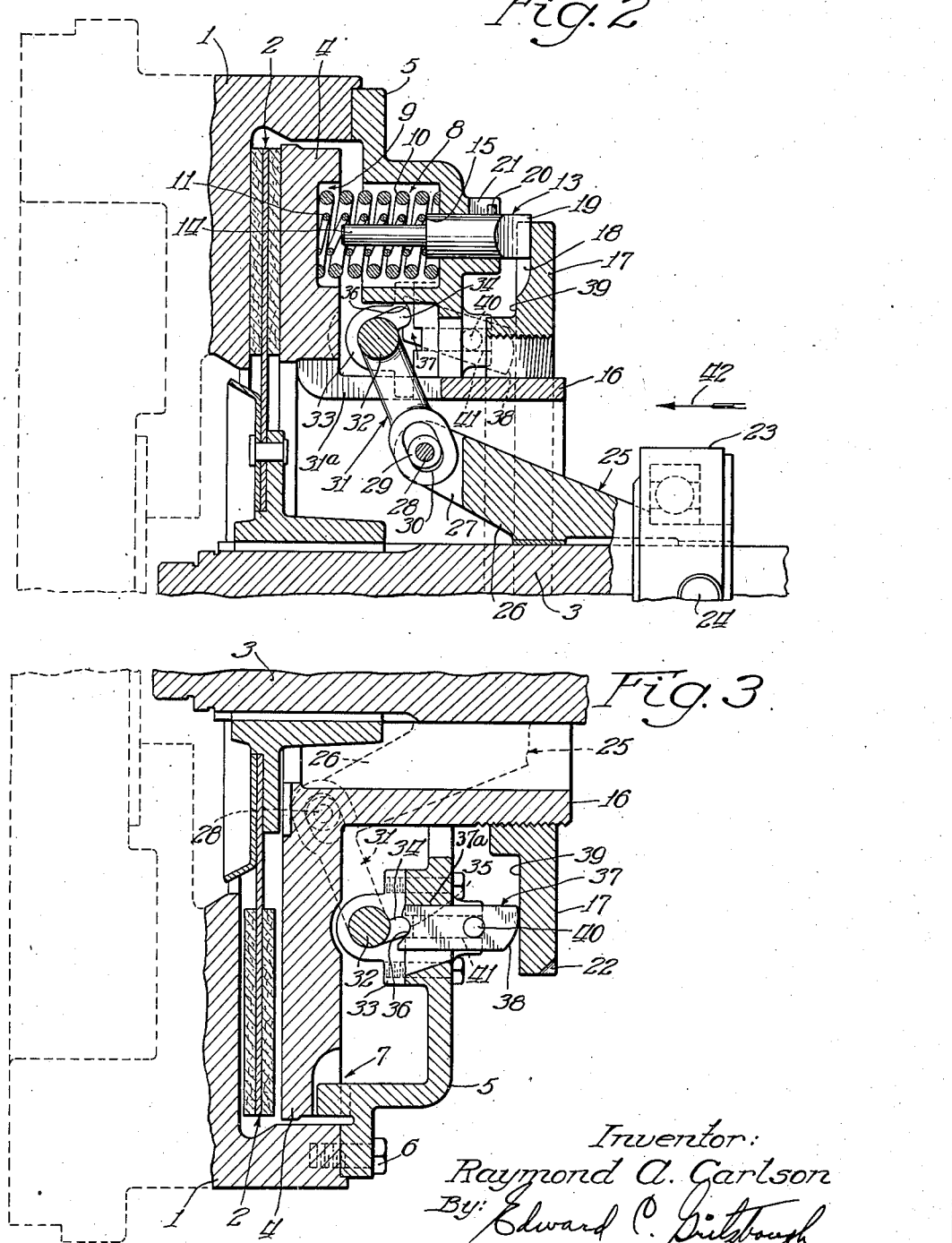

2,115,252

UNITED STATES PATENT OFFICE 2,115,252

FRICTION CLUTCH

Raymond A. Carlson, Rockford, Ill., assignor to Borg-Warner Corporation, Chicago, Ill., a corporation of Illinois Application December 1, 1936, Serial No. 113,593

6 Claims. (Cl. 192—68)

This invention relates to friction clutches and is concerned more particularly with a power transmitting spring loaded clutch of the toggle-operated type.

It is an object of my invention to provide an improved spring loaded clutch of the toggle-operated type which requires relatively little manual effort to effect clutch release and to hold the clutch in full release position, yet which employs relatively heavy pressure plate operating springs.

It is another object of the invention to provide in a clutch of the character described a toggle-operated clutch release mechanism which is operative without requiring over-center movement of the mechanism.

Further objects and advantages of the invention will appear as the description proceeds.

An illustrated embodiment of the invention appears in the accompanying drawings and is described hereinafter. In the drawings:

Fig. 1 is a rear plan view of a clutch embodying the invention, portions thereof being broken away;

Fig. 2 is a longitudinal fragmentary sectional view taken substantially as indicated by the line II—II in Fig. 1; and Fig. 3 is a longitudinal fragmentary sectional view taken substantially as indicated by the line III—III in Fig. 1, but showing the parts as they appear when the clutch is disengaged.

Referring more particularly to the drawings, the flywheel 1 or other suitable driving member is engageable with a driven clutch plate 2 carried by the clutch shaft 3, the clutch plate 2 being urged against the flywheel by a spring-urged pressure plate 4. A cover plate 5, secured at 6 to the flywheel has a key-like connection at 7 with the pressure plate to drive the latter, but to permit of its axial movement, and is provided with a plurality of circular recesses 8 substantially registering with corresponding recesses 9 in the pressure plate to house an outer relatively heavy spring 10 and an inner relatively light spring 11.

Extending through the bottom of each recess 8 there is a pin 13 having a reduced tail portion 14 telescoped within the inner spring 11 and providing a shoulder 15 forming an abutment for one end of the inner spring 11. The pressure plate 4 has a rearwardly extending sleeve 16 to which is threaded an adjusting nut, or plate, 17 engageable by clutch releasing means, the description of which appears hereinafter. The plate 17 is provided on its forward face with notches 18, one for each pin 13, and each pin has its rear end tapered to form a V-nose 19 adapted to be held by the spring 11 in a corresponding notch 18 and to cooperate ratchetwise therewith. A lug 20 projecting from each pin 13 into a slot 21 in the plate 5 prevents the nose 19 of each pin from turning out of register with the notches 18. The rear face of the plate 17 is provided with a plurality of notches 22 engageable by a suitable tool for manual adjustment by rotation of the plate about the sleeve 16. Such rotation of the plate is accompanied by ratchet movement of the pins 13 associated with the notches 18, the plate being brought to rest with each pin 13 disposed in a notch 18. This mechanism operates therefore not only to vary the adjustment of the plate 17 relative to the pressure plate 4, but to maintain the plate 17 against accidental displacement.

Means for releasing the pressure plate 4 against the compression of the springs 10 may comprise a collar 23, having trunnions 24 to be received by a fork (not shown) operated by the foot of the driver against the action of the usual fork spring to effect the release of the clutch, and adapted, upon release of the clutch pedal by the driver, to permit engagement of the clutch. The collar 23 is secured to a sleeve 25 provided with a plurality of arms 26 having forked ends 27 bridged by a pivot pin 28 about which an anti-friction sleeve roller 29 is fitted, the roller 29 being fitted in the slot 30 of a bell crank lever 31. The lever 31 passes through a slot 31a in the pressure plate sleeve 16 and terminates in a rod portion 32 having its ends journalled in anti-friction bearing means 33 carried by the cover 5. A thrust arm 34 is carried one at each end portion of the rod 32. Each arm 34 has a rounded bearing end 35 slidably engageable with a correspondingly shaped concavity 36 in a thrust member 37 whose outer end is cam-shaped as shown at 38 for engagement with the forward face 39 of the adjusting plate 17. The thrust members 37 are provided with opposed trunnions 40 slidably and rotatably received in opposed slots 41 in the back plate 5 so that upon shift of the sleeve 23 in the forward direction, indicated by the arrow 42 in Figure 2, the thrust arms 34 will impart a combined rearward sliding and counter-clockwise movement to the thrust members 37, as viewed in Fig. 2, the cam surfaces 38 of which will be forced against the inner surface 39 of the plate 17, causing the plate and with it the pressure plate 4 to recede from the driven clutch plate 2, thereby to release the clutch against the compression of the pressure plate springs 10.

As will be observed from Figs. 2 and 3, the action of this mechanism is substantially a toggle action, and when the sleeve 23 reaches the limit of its forward movement, the toggle mechanism is at or short of dead center, as seen in Fig. 3. The slots 41 are of such length that they do not interfere with the sliding movement of the trunnions 40 throughout the limits of movement of the members 37 against the plate 17. In order that the toggle mechanism including the thrust members 37 and arms 34 may not pass beyond the dead center established between the fulcrum points 32 and 40, that portion of the back plate 5 through which the thrust members 37 extend may be formed with surfaces 37a against which the inner end portions of the thrust members may rest (as shown in Fig. 3) when the clutch is in its fully released position.

While I have illustrated a mechanism by which the clutch is released in response to thrust applied to the collar 23, it will be appreciated that by a mere reversal of arrangement, clutch disengagement may be effected upon drawing the collar.

This clutch structure is adapted for use in trucks and for other heavy duty purposes, and when so employed, its springs 10 may be considerably stronger than those found in conventional passenger automobile clutches.

When the clutch is engaged, the springs 19 maintain engagement until manual or power disengagement is brought about through the toggle mechanism. Once the clutch is disengaged, the toggle arrangement is such as to maintain disengagement with relatively little manual effort.

Clearance, preferably not more than $\frac{1}{16}$", is afforded between the thrust members 37 and the plate 17 when the clutch is engaged, to provide a slight lost motion of the clutch release sleeve 23 preparatory to the commencement of the disengaging action.

I claim:

1. A clutch for motor vehicles comprising a cover plate, a pressure plate located on the inner side of said cover plate and adapted to move axially thereof, compression springs interposed between said pressure plate and said cover plate, an operating plate located on the outer side of said cover plate and parallel with said pressure plate, spring-restrained adjustable means securing said operating plate against movement relative to said pressure plate whereby the distance between said pressure plate and said operating plate may be varied at will, and clutch release means associated with said cover plate including a toggle mechanism one member of which is engageable with said operating plate for applying thrust to said operating plate in a direction against the force of said compression springs when the toggle mechanism is moved toward its dead center.

2. A clutch for motor vehicles comprising a cover plate, a pressure plate located on the inner side of said cover plate and adapted to move axially thereof, compression springs interposed between said pressure plate and said cover plate, an operating plate located on the outer side of said cover plate and parallel with said pressure plate, adjustable means securing said operating plate against movement relative to said pressure plate whereby the distance between said pressure plate and said operating plate may be varied at will, and clutch release means associated with said cover plate including a plurality of toggle means each having two arms, one engageable with said operating plate, and the other pivoted on said cover plate, and common means for operating said toggle means simultaneously thereby to transmit thrust to said operating plate at a plurality of distributed points.

3. A motor vehicle clutch comprising a cover, a pressure plate mounted on the inner side of said cover, said pressure plate having a central portion extending through an opening in said cover, an operating plate located on the outer side of said cover, and having screw thread engagement with said last named pressure plate portion whereby the operating plate may be moved toward and away from said pressure plate at will, means associated with said cover and said operating plate for locking said operating plate against movement relative to said pressure plate, toggle mechanism including a member engageable with said operating plate and a member having an operating arm and means adapted for manual control to move said arm whereby to operate said toggle mechanism thereby to move said pressure plate.

4. A motor vehicle clutch comprising a cover, a pressure plate mounted on the inner side of said cover, said pressure plate having a central portion extending through an opening in said cover, an operating plate located on the outer side of said cover, and having screw thread engagement with said last named pressure plate portion whereby the operating plate may be moved toward and away from said pressure plate at will, means locking said operating plate against movement relative to said pressure plate, toggle mechanism including a member engageable with said operating plate and a member having an operating arm and means adapted for manual control to move said arm whereby to operate said toggle mechanism thereby to move said pressure plate, said toggle mechanism being mounted upon said cover and including means preventing the movement of the toggle mechanism beyond its dead center.

5. A motor vehicle clutch comprising a cover, a pressure plate located on the inner side of said cover, compression springs urging said pressure plate in a direction away from said cover along the longitudinal axis thereof, an operating plate located on the outer side of said cover in parallel relationship to said pressure plate, toggle mechanism carried by said cover, having one of the elements thereof engageable with said operating plate, the other element of said toggle mechanism having an arm extending therefrom, manually operated means for moving said arm whereby to operate said toggle mechanism, and means limiting the operation of said toggle mechanism to movement on one side only of its dead center.

6. A motor vehicle clutch comprising a cover, a pressure plate mounted on the inner side of said cover, said pressure plate having a central portion extending through an opening in said cover, an operating plate located on the outer side of said cover, and having screw thread engagement with said last named pressure plate portion whereby the operating plate may be moved toward and away from said pressure plate at will, means locking said operating plate against movement relative to said pressure plate, toggle mechanism including a member engageable with said operating plate and a member having an operating arm and means adapted for manual control to move said arm whereby to operate said toggle mechanism thereby to move said pressure plate, said toggle mechanism including said member engageable with the operating plate and said operating arm being wholly disposed between the operating plate and the pressure plate.

RAYMOND A. CARLSON.